United States Patent
Lochocki, Jr. et al.

(10) Patent No.: US 9,068,518 B2
(45) Date of Patent: Jun. 30, 2015

(54) MONITORING OF TRANSMISSION-TO-ENGINE SPEED REQUESTS

(71) Applicant: GM GLOBAL TECHNOLOGY OPERATIONS LLC, Detroit, MI (US)

(72) Inventors: Ronald F. Lochocki, Jr., Ypsilanti, MI (US); Scott D. Biggs, Milford, MI (US); Shih-Ying Sheu, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 55 days.

(21) Appl. No.: 13/951,937

(22) Filed: Jul. 26, 2013

(65) Prior Publication Data

US 2015/0032360 A1    Jan. 29, 2015

(51) Int. Cl.
*G06F 7/00* (2006.01)
*F02D 28/00* (2006.01)
*B60W 10/04* (2006.01)
*B60W 10/06* (2006.01)
*B60W 10/10* (2012.01)
*B60W 50/00* (2006.01)

(52) U.S. Cl.
CPC ............... *F02D 28/00* (2013.01); *B60W 10/04* (2013.01); *B60W 10/06* (2013.01); *B60W 10/10* (2013.01); *B60W 50/0097* (2013.01); *B60W 2510/0638* (2013.01)

(58) Field of Classification Search
CPC ..... B60W 10/04; B60W 10/06; B60W 10/10; B60W 20/102; B60W 50/0097; B60W 2510/0638; B60W 2510/1015; B60W 2710/081; B60W 2710/1011
See application file for complete search history.

(56) References Cited

U.S. PATENT DOCUMENTS 8,690,730 B2 *   4/2014   Wright et al. ................. 477/107

* cited by examiner

*Primary Examiner* — David D Le
(74) *Attorney, Agent, or Firm* — Quinn Law Group, PLLC

(57) ABSTRACT

A vehicle includes an engine having a crankshaft which rotates at an engine speed, a transmission having a rotatable input member, a transmission control module (TC), and an engine control module (ECM) in communication with the TCM. The TCM is programmed to execute a transmission-to-engine speed monitoring and control method which includes transmitting an engine speed request to the ECM which requests a positive increase in the engine speed, and terminating the request when the request is active for more than a first calibrated timeout duration. The TCM also terminates the request when the request is active for more than a second calibrated duration that is less than the first calibrated duration, the transmission is not in neutral, and both a shift of the transmission and an acceleration of the input member are not active.

16 Claims, 2 Drawing Sheets

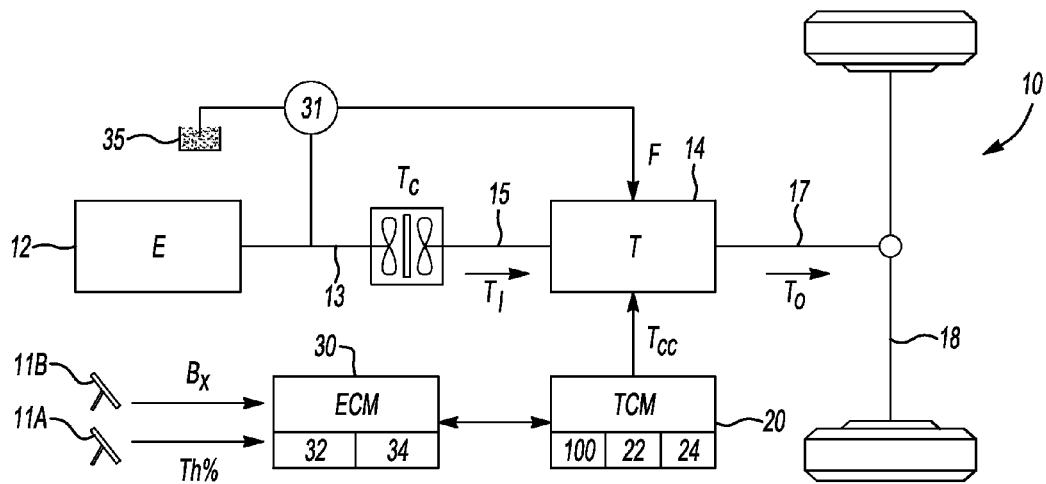
*Fig-1*
| # | $T_{VAL}$ | R.T. | T.O. | F.S. |
|---|---|---|---|---|
| T1 | $^+N_{12R}$ | $N_{12R}>0$ | $>CAL(1)$ | ENBL |
| T2 | ACT | $N_{12R}>0$ | $>CAL(2)$ | ENBL |
| T3 | $R_N(t)$ | $R_N>CAL(R)$ | $>CAL(R)$ | DSBL |
| T4 | $\triangle R(t)$ | $\triangle R=[CAL]$ | $=[CAL_{min}, CAL_{max}]$ | DSBL |
| T5 | $\triangle 15(t)$ | $\triangle 15<CAL$ | +TIS in $CAL(2)$ | DSBL |
*Fig-2*
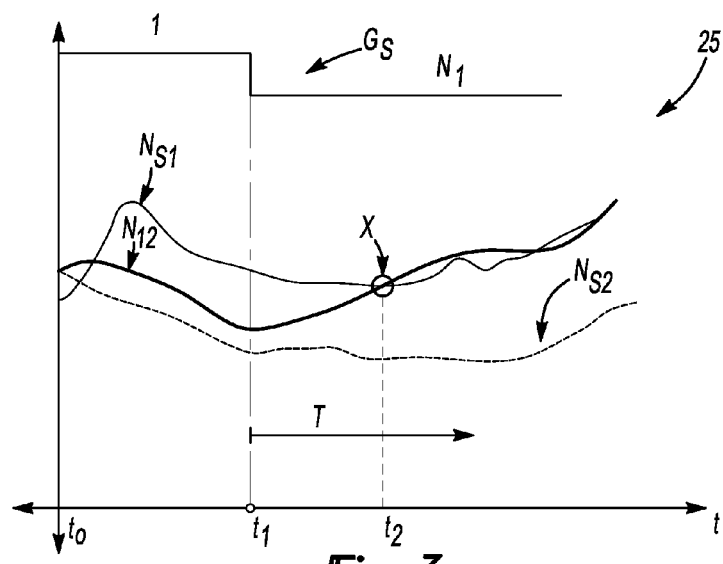
*Fig-3*

MONITORING OF TRANSMISSION-TO-ENGINE SPEED REQUESTS

TECHNICAL FIELD

This disclosure relates to the monitoring of transmission-to-engine speed requests.

BACKGROUND

In a vehicle transmission, hydraulically-actuated clutches are selectively applied to couple transmission input and output members in a desired speed ratio. A clutch-to-clutch shift occurs via a coordinated release of a clutch associated with the current speed ratio, i.e., the offgoing clutch, and engagement of another clutch associated with a desired new speed ratio, i.e., the oncoming clutch. Shifts in automatic transmissions, as well as in dual clutch transmissions and automated manual transmissions, are prompted by vehicle parameters, including throttle request and vehicle speed, the latter of which is affected by braking levels.

A typical vehicle control system includes an engine control module (ECM), which has overall authority for engine speed and torque functionality, and a transmission control module (TCM), which controls the functionality of the various clutches of the powertrain. The ECM is responsive to throttle level. The TCM, which is in communication with the ECM over a controller area network (CAN) bus, requests changes in engine speed from the ECM as part of its overall shift control function.

SUMMARY

A vehicle is disclosed herein. The vehicle includes an internal combustion engine, a transmission, a transmission control module (TCM), and an engine control module (ECM). The TCM is programmed or otherwise configured to monitor TCM-initiated transmission-to-engine requests for positive changes in engine speed in the course of executing a predetermined shift event. As the shift commences, the TCM evaluates a set of parameters against a set of criteria, including if the speed request is present for too long relative to a first calibrated duration, and also if the request is active for a shorter second duration at unexpected times. If these criteria are not satisfied, the TCM automatically executes a "fail soft" control action in which the speed request is automatically terminated.

Specifically, the TCM is responsible for determining if there has been an improperly formed and overly sustained engine speed request. If so, the TCM triggers a fail-safe control action by terminating the outgoing engine speed request from the TCM under two conditions: (I) when there is an active positive engine speed request of a first calibrated duration, e.g., 900 ms, and (II) when there is an active positive engine speed request of a much shorter second duration, e.g., about 200 ms, or 150 ms to 250 ms, with no corresponding active neutral state, shift event, or input acceleration.

In a requested downshift, for example, the TCM commands a given transmission shaft to rotate at a higher speed necessary for completing the shift to a lower gear. The TCM requests, via the ECM, that engine speed increases to this higher speed. The present control approach is based on the recognition that unintended input acceleration may occur during a requested engine speed change if the engine speed request is held too long without seeing certain expected control responses, including a rise in engine speed and a dovetailing of transmission shaft speed with engine speed.

In particular, a vehicle is disclosed herein having an engine, a transmission, a TCM, and an ECM. The TCM is programmed to transmit an engine speed request to the ECM which requests a positive increase in the engine speed in anticipation of a predetermined shift event of the transmission. The TCM is also programmed to automatically terminate the engine speed request whenever the positive engine speed request is active for more than a first calibrated timeout duration, and also when (a) the positive engine speed request is active for more than a second calibrated duration that is less than the first calibrated duration, and (b) the transmission is not in neutral, and both a shift of the transmission and an acceleration of the input member are not active.

A transmission assembly is also disclosed including the transmission and the TCM, which is configured as noted above.

An associated method for use in the above described vehicle includes transmitting the engine speed request from the TCM to the ECM, determining whether the engine speed request is active for more than a first calibrated timeout duration, and automatically terminating the engine speed request when the engine speed request is active for more than the first calibrated timeout duration. The method also includes automatically terminating the engine speed request when the transmission is not in neutral, and both the predetermined shift of the transmission and an acceleration of the input member are not active.

The above features and advantages, and other features and advantages, of the present invention are readily apparent from the following detailed description of some of the best modes and other embodiments for carrying out the invention, as defined in the appended claims, when taken in connection with the accompanying drawings.

BRIEF DESCRIPTION OF THE DRAWINGS

FIG. 1 is a schematic illustration of a vehicle having a transmission and a controller which monitors transmission-to-engine speed requests and selectively executes a fail-soft control action to abort such a request, as set forth in detail herein.

FIG. 2 is a table describing different timer values that are evaluated as part of the transmission-to-engine speed request monitoring approach.

FIG. 3 is a time plot describing changing speeds of different vehicle shafts during an example rolling neutral shift.

DETAILED DESCRIPTION

Figure 4:
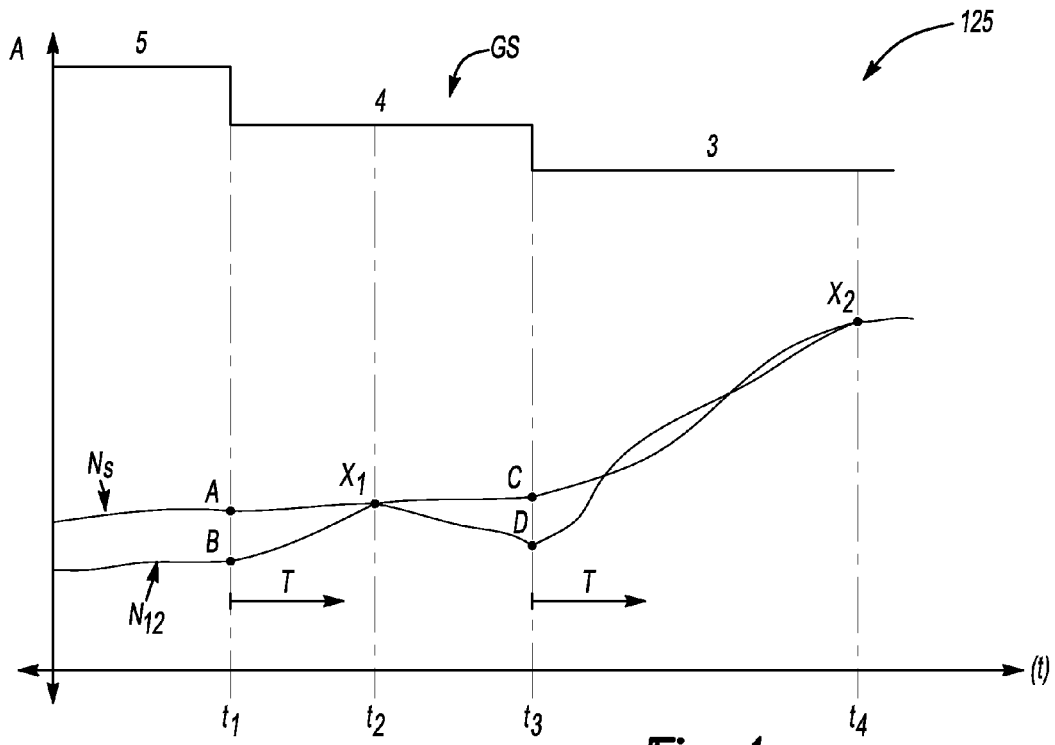
FIG. 4 is a time plot describing changing speeds of different vehicle shafts during an example 5-3 tap downshift.

Referring to the drawings, wherein like reference numbers refer to like components throughout the several Figures, a vehicle 10 is shown schematically in FIG. 1. The vehicle 10 includes an engine 12, a transmission control module (TCM) 20, and an engine control module (ECM) 30. The TCM 20 monitors speed requests to the engine 12 via execution of computer-executable logic 100, i.e., code or instructions recorded in memory 24 of the TCM 20 and executed as needed by a processor 22. In particular, the TCM 20 selectively enables a "fail soft" control action in which a request to the ECM 30 for increased engine speed is aborted when certain events have not occurred within different threshold intervals. Execution of the logic 100 and its effect on the performance of the vehicle 10 is described in further detail below with reference to FIGS. 2-5.

With respect to the structure of the vehicle 10 shown in FIG. 1, in addition to the engine 12, the vehicle 10 also includes a transmission 14. The transmission 14 is depicted in FIG. 1 as an automatic transmission. However, the transmission 14 may be configured in the alternative as a dual-clutch transmission (DCT) or an automated manual transmission (AMT). As is well known in the art, a DCT has oddly-numbered and evenly-numbered gear sets and a pair of input clutches, with each input clutch being separately applied depending on the requested gear state. That is, one input clutch selects the oddly-numbered gear sets while the other is used to select the evenly-numbered gear sets. An AMT, which has a single input clutch, is otherwise similar to a DCT in its design. For illustrative consistency, the automatic transmission example of FIG. 1 will be referred to hereinafter.

The TCM 20 and ECM 30 communicate with each other over a controller area network (CAN) bus or other suitable communications path. Both are configured, i.e., programmed and sufficiently equipped in hardware, to execute any requisite assigned steps of the logic 100, with the underlying logic 100 residing primarily in the memory 24 of the TCM 20. The engine 12 is responsive to a received throttle request (arrow Th %), typically commanded as a percentage of travel of an accelerator pedal 11A indicating a relative level of driver-requested axle torque. Such travel may be detected via a pedal sensor (not shown) in the conventional manner. Travel of a brake pedal 11B may likewise be captured as a braking signal (arrow $B_X$) that is input to the ECM 30. Levels input to the ECM 30 may be known to the TCM 30 by virtue of the CAN bus connection.

In response to receipt of the throttle request (arrow Th %), the engine 12 delivers input torque (arrow $T_I$) to a crankshaft 13, with the input torque (arrow $T_I$) ultimately transmitted to an input member 15 of the transmission 14 via a hydrodynamic torque converter (TC). An output shaft 17 of the transmission 14 is connected to a set of drive wheels 19 via one or more drive axles 18. The output shaft 17 ultimately transmits output torque (arrow $T_O$) to the drive wheels 19 via the drive axles 18. Hydraulic elements of the transmission 14 may be powered by circulation of fluid (arrow F) from a sump 35 via an engine-driven main pump 31, or alternatively via a battery-driven auxiliary pump (not shown).

Still referring to FIG. 1, the TCM 20 and ECM 30 may be configured as a microprocessor-based computer devices having hardware elements such as processors 22, 32, memory 24, 34 including but not limited to tangible, non-transitory computer-readable media such as read only memory (ROM), optical memory, solid state flash memory, and the like, as well as random access memory (RAM), electrically-erasable programmable read-only memory (EEPROM), flash memory, etc., and circuitry including but not limited to a high-speed clock, analog-to-digital (A/D) circuitry, digital-to-analog (D/A) circuitry, a digital signal processor or DSP, transceivers, and the necessary input/output (I/O) devices and other signal conditioning and/or buffer circuitry.

The TCM 20 ultimately transmits a torque command (arrow $T_{CC}$) to the transmission 14, or more precisely to any clutches used therein to transfer torque in a requested gear shift event. In an automatic transmission of the type shown in FIG. 1, such a torque command (arrow $T_{CC}$) may be translated into corresponding pressure commands, while a DCT or AMT configuration may translate the torque commands (arrow $T_{CC}$) into any corresponding position commands necessary for moving a clutch piston (not shown) to a required position.

To implement the transmission-to-engine speed monitoring approach described herein, the logic 100 of the TCM 20 can run as computer-executable script or code in conjunction with any existing transmission-to-engine speed request routines. The monitoring logic can execute on a request to the ECM 30 for requested positive change in engine speed. When an increase in engine speed is requested by the TCM 20, torque output from the engine 12 increases. It is recognized herein that if this torque increase were to occur while the transmission 14 maintains a direct mechanical powerflow connection to the drive axles 18, transient axle torque of a sufficient level and duration could result. Therefore, the control approach taken herein is intended to suppress any unexpected extended engine speed requests and thereby prevent delivery of any unintended axle torque to the drive axles 18.

In other words, the TCM 20 of FIG. 1, using the logic 100 and the associated methodology such logic 100 embodies, rationalizes transmission gearbox behavior during all positive engine speed requests. The TCM 20 "fails soft" by cancelling increased speed requests at certain times before the request can be sent to an onboard CAN message handler for assembly and transmitting of a CAN message to the ECM 30. Additionally, the approach disclosed helps to ensure that all positive torque requests resulting return to zero within no more than 1 second, which may satisfy certain design requirements.

The methodology enabled by execution of the logic 100 is first explained with reference to the table shown in FIG. 2. As part of the overall transmission-to-engine speed monitoring and control approach disclosed herein, time-out subroutines are used to compare lengths of certain shift mode-dependent events to a corresponding calibration value, and to selectively output a bit flag based on the results of the comparisons. The various time-out subroutines, which are abbreviated hereinafter as T1-T5, separately screen for the presence or absence of a given shift mode-dependent condition. Two example modes, a rolling neutral shift and a 5-3 tap downshift, are described below with reference to FIGS. 3 and 4, with value comparisons used in a downshift generally described with reference to FIG. 5.

The table of FIG. 2 is organized in columns, with column # listing the time-out subroutines T1-T5 and column $T_{VAL}$ listing the timer value being examined in a particular one of the subroutine T1-T5. Columns R.T. and T.O. represent the run threshold and time-out threshold, respectively. Column F.S. lists the associated "fail soft" decision of the TCM 20 shown in FIG. 1.

For subroutine T1, which is the master timed subroutine, a timer of the processor 22 of the TCM 20 shown in FIG. 1 is started immediately upon detection of a timer value (column $T_{VAL}$) in the form of a positive engine speed request, which is abbreviated in FIG. 2 as $+N_{12R}$. The run threshold (column R.T.) for launching the time-out subroutine T1 is a request by the TCM 20 for a positive change in engine speed, i.e., $N_{12R}>0$. A time out (column T.O.) event occurs if this request remains present for a first calibrated duration, abbreviated as >CAL(1) in FIG. 2. CAL(1) may be about 800 ms to 900 ms in one embodiment, which is less than the 1000 ms design threshold noted above, while still allowing time to complete a shift event or abort a speed request without executing the shift event. Fail-soft (column F.S.) actions such as aborting the speed request are enabled (ENBL) whenever the request is sustained for the first calibrated duration CAL (1). Because time-out subroutine T1 runs in the background while the remaining time-out subroutines T2-T5 continue, time-out subroutine T1 acts as the master time-out subroutine.

For time-out subroutine T2, a shorter calibrated duration, CAL(2), is used as the timeout criteria. Fail-soft actions are enabled (ENBL) if this time period, which may be 150 ms to 250 ms in one embodiment, or 200 ms in another embodiment, is exceeded without the TCM 20 of FIG. 1 seeing one of the actions of time-out subroutines T3-T5.

Time-out subroutine T3 is used during neutral shifts of the transmission 14 shown in FIG. 1. Here, the TCM 20 checks the elapsed time since a calibrated neutral gear ratio ($R_N$) is achieved. The run threshold (column R.T.) in this instance is a calibrated neutral gear ratio, abbreviated CAL(R). In an example embodiment, a gear ratio of at least 17 indicates that the vehicle 10 is in neutral. The actual neutral gear ratio for a given vehicle, however, may vary from this number. Fail-soft control actions are disabled (DSBL) when the vehicle 10 of FIG. 1 is in a neutral state for longer than the calibrated neutral gear ratio, CAL(R).

The remaining time-out subroutines T4 and T5 are used to screen for downshifts. Other time-out subroutines may be used in upshift examples and the like, without departing from the present scope, as will be understood by those of ordinary skill in the art. Two conditions the TCM 20 looks for in this instance is time-out subroutine T4, which examines the elapsed time since an immediately prior gear ratio change, and time-out subroutine T5, which examines the elapsed time since a flare or increase in speed is observed in the transmission input member 15 of FIG. 1. This is abbreviated as TIS in FIG. 2, i.e., transmission input speed, which is essentially equal to the engine speed.

In other words, time-out subroutine T5 looks to see that the engine 12 of FIG. 1 has begun to respond to a request for a positive engine speed change within the second calibrated time CAL (2) used by time-out subroutine T2, while time-out subroutine T4 looks to see that the gear ratio has begun changing as expected to within a range of ratios, i.e., $\Delta R = [CAL_{min}, CAL_{max}]$. If these conditions are present, the fail-soft actions are disabled (DSBL). These time-out rules will now be explained with reference to FIGS. 3 and 4.

Referring first to FIG. 3, a time plot 25 depicts transmission shaft speeds (traces $N_{S1}$, $N_{S2}$) and engine speed (trace $N_{12}$) during an example rolling neutral gear shift. Amplitude (A) is plotted on the vertical axis, while time t is plotted on the horizontal axis. Trace GS represents the commanded gear state, with first gear (1) shown as the gear state that is selected between $t_0$ and $t_1$ and neutral (N) commencing at $t_1$.

Prior to $t_1$, as the vehicle 10 of FIG. 1 rolls in first gear at a low rate of speed, engine speed (trace $N_{12}$) slowly falls and drifts between shaft speed ($N_{S1}$, $N_{S2}$) as the vehicle 10 coasts. A requested shift in gear state to neutral (N), and thus a change in requested engine speed, occurs at $t_1$ automatically via the internal shift decision logic of the TCM 20. The TCM 20 starts a timer at $t_1$, as indicated by arrow T, and thus commences time-out subroutine T1.

After the positive speed request is received by the ECM 30 at $t_1$, engine speed (trace $N_{12}$) rises to the shaft speed ($N_{S1}$) as needed for completing the shift from $1^{st}$ gear (1) to neutral (N). The speeds match up at about point X as shown. In this example, using the table of FIG. 2, the TCM 20 would evaluate, at the second calibration duration CAL (2), whether the calibrated neutral ratio has been present for that duration. If so, the TCM 20 does not fail-soft, but rather continues with the shift action. Of course, the top-level timer counting through time-out subroutine T1 of FIG. 2 continues, and therefore the shift action could still be terminated in the event that the action cannot be completed by the end of the CAL (1) duration, e.g., 900 ms.

FIG. 4 depicts another time plot 125, this time for an example 5-3 tap downshift, which is actually a series of two downshifts with two requests in quick succession. Only one shaft speed (trace NS) is shown, along with engine speed (trace $N_{12}$). Here, the gear state (GS) steps from $5^{th}$ to $4^{th}$ gear at $t_1$ when the shaft speed ($N_S$) of the transmission shaft that will be requested to carry the torque from the engine in $4^{th}$ gear is at point A and the engine speed (trace $N_{12}$) is at point B. A timer first starts at $t_1$ as indicated by arrow T, and the TCM 20 of FIG. 1 starts time-out subroutines T1, T2, T4, and T5 of FIG. 2. Time-out subroutine T3 is not required in this example, as the transmission 14 is not in neutral when the shift and speed change are requested.

In the example tap downshift maneuver shown in FIG. 4, engine speed (trace $N_{12}$) rises and meets up with the shaft speed ($N_S$) at $t_2$, or about point $X_1$. If this occurs within the window of time allotted by time-out subroutines T4 and T5 of FIG. 2, the shift is allowed to continue. The shift from $4^{th}$ gear to $3^{rd}$ gear proceeds in the same manner, with the timer starting anew at $t_3$ as shown, and with the engine speed ($N_{12}$) ultimately meeting up with shaft speed ($N_S$) at $t_4$, i.e., about point $X_2$.

Figure 5:
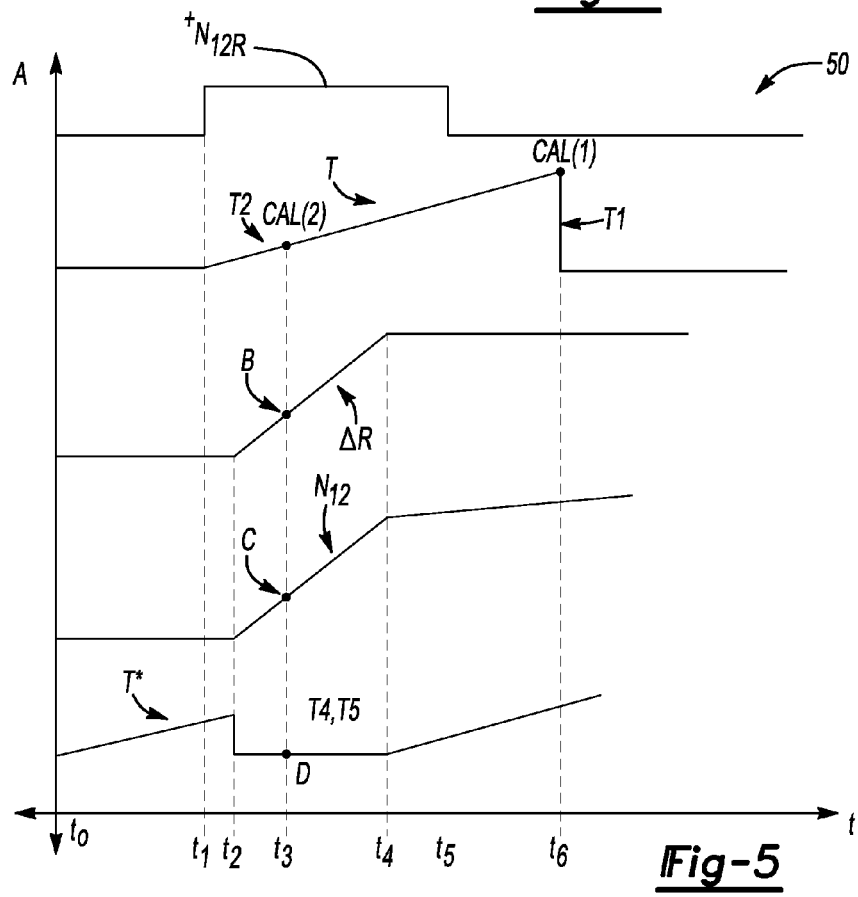
FIG. 5 is a time plot of timer values and vehicle performance parameters, including an engine speed request, a gear ratio, and engine speed describing an example downshift application of the present transmission-to-engine speed request monitoring approach.

Referring to FIG. 5, the transmission-to-engine speed monitoring and control approach set forth above is shown schematically via a set of traces 50. A positive engine speed request is represented by trace $+N_{12}$, shown as a pulse signal which commences at $t_1$ and continues until $t_5$. The master timer is started at the same time, with the timer trace denoted as T for simplicity. Time-out subroutine T1, which provides the top-level time limit for completion of the entire requested maneuver, is shown at about $t_6$. This time corresponds to CAL (1) of FIG. 2, and as noted with respect to that Figure, may be about 900 ms, or 800 to 900 ms. Thus, in the example of FIG. 5, the speed request ends at $t_5$, which is before the maximum allotted time ending at $t_6$. Had the speed request continued past $t_6$, this would have resulted in the aborting of the request, i.e., via time-out subroutine T1.

CAL (2) corresponds to $t_3$ in FIG. 5, and represents the second calibrated duration T2. This time may be about 200 ms in a possible embodiment, and in any event should be about 25% to 33% of the value of CAL (1). For a downshift, this time period is closely examined by the TCM 20 of FIG. 1 to determine if flare of the input member 15 to the transmission 14 or an expected change in gear ratio has occurred. These events, in the expected 200 ms timeframe, allow the requested increase in engine speed to continue. The change in gear ratio during the downshift is indicated by trace ($\Delta R$). The change in engine speed is indicated by trace $N_{12}$.

The time-out times for time-out subroutines T4 and T5 are both shown with respect to timer trace T*. The timer associated with time-out subroutine T3 is omitted from FIG. 5. Subroutine T3, which relates to neutral shifts, remains at zero during the example downshift of FIG. 5, and thus does not factor into the analysis in this example. The timer associated with time-out subroutine T4 counts the time since the last gear ratio change via timer trace T*. So, this timer counts up from t0 to t2 when the gear ratio starts to change, as indicated by trace $\Delta R$. At this point, the timer counting trace T* resets to zero, and remains there so long as the gear ratio is changing. Likewise, time-out subroutine T5 follows a similar process, measuring the time since the onset of flare of the input member 15.

Therefore, following the example of FIG. 5, between $t_0$ and $t_1$, the vehicle 10 is traveling in a higher gear, and the timer associated with trace T* is counting up from the moment of the onset of the last gear ratio change at or prior to $t_0$. A request for a positive engine speed increase is made at $t_1$ and held until $t_5$, as indicated by the upper most trace +$N_{12R}$. The timer associated with time-out subroutine T1 starts at the same moment, i.e., at $t_1$, and continues until the first calibrated duration CAL (1) is reached at $t_6$. Regardless of what else occurs, this master level timer will ensure that the request is aborted if held too long, such as beyond 900 ms. In this example, the request stops at $t_5$, and thus the timer would rest at this point, with the timer trace (T) continuing to $t_6$ solely for illustrative purposes in FIG. 5.

The second calibrated duration CAL (2) is shown at $t_3$. The TCM 20 of FIG. 1 looks to the gear ratio (ΔR) and the changing engine speed ($N_{12}$) a duration CAL (2) after the last gear ratio change to see if the change in ratio, i.e., the delta ratio, is between two limit calibrations. See point B of corresponding point of trace ΔR. The TCM 20 also looks at the change in speed of the input member 15 at the same point to see if there has been a flare, indicating that the engine 12 has responded to the request for a positive change in speed. This is illustrated via point D of FIG. 5. The TCM 20 sets a bit flag of 1/TRUE if such flare is not seen at the second calibrated duration CAL (2), which causes cancellation of the request made back at $t_1$.

Using the above approach, the TCM 20 of FIG. 1 is able to determine whether an unexpected request is active for a sufficient duration. If so, the TCM 20 fail-softs by aborting the request for increased engine speed. Fail-soft control steps occur if an active positive engine speed request of the first calibrated duration CAL(1), i.e., subroutine (T1). Additionally, fail-soft of the request is enabled if there is an active positive engine speed request of the second calibrated duration CAL(2), i.e. T2=TRUE, while not in neutral (T3=FALSE) and while an active shift (T4=FALSE) and acceleration (T5=FALSE) are not present.

The detailed description and the drawings or figures are supportive and descriptive of the invention, but the scope of the invention is defined solely by the claims. While the best mode, if known, and other embodiments for carrying out the claimed invention have been described in detail, various alternative designs and embodiments exist for practicing the invention defined in the appended claims.

The invention claimed is:

1. A vehicle comprising:
an engine having a crankshaft which rotates at an engine speed;
a transmission having a rotatable input member;
a transmission control module (TCM); and
an engine control module (ECM) in communication with the TCM;
wherein the TCM is programmed to transmit an engine speed request to the ECM which requests a positive increase in the engine speed in anticipation of a predetermined shift event of the transmission, and to automatically terminate the engine speed request when the positive engine speed request is active for more than a first calibrated timeout duration when the transmission is not in neutral and both a shift of the transmission and an acceleration of the input member are not active, and after a second timeout duration that exceeds the first calibrated timeout duration regardless of whether the transmission is in neutral and the shift of the transmission and the acceleration of the input member are active.

2. The vehicle of claim 1, wherein the TCM is programmed to calculate a neutral speed ratio of the transmission, and to compare the calculated neutral speed ratio to a calibrated ratio to determine whether the transmission is not in neutral.

3. The vehicle of claim 1, wherein the second calibrated timeout duration is about 800 ms to 900 ms.

4. The vehicle of claim 1, wherein the first calibrated timeout duration is about 150 ms to 250 ms.

5. The vehicle of claim 1, wherein the transmission is an automatic transmission.

6. The vehicle of claim 1, wherein the predetermined shift event is a downshift.

7. A transmission assembly for use in a vehicle having an engine control module (ECM) and an engine, wherein the engine includes a crankshaft which rotates at an engine speed, the transmission assembly comprising:
a transmission having a rotatable shaft; and
a transmission control module (TCM) in communication with the ECM;
wherein the TCM is programmed to transmit an engine speed request to the ECM which requests a positive increase in the engine speed in anticipation of a predetermined shift event of the transmission, and to automatically terminate the engine speed request when the positive engine speed request is active for more than a first calibrated timeout duration when the transmission is not in neutral and both a shift of the transmission and an acceleration of the input member are not active, and after a second timeout duration that exceeds the first calibrated timeout duration regardless of whether the transmission is in neutral and the shift of the transmission and the acceleration of the input member are active.

8. The transmission assembly of claim 7, wherein the TCM is programmed to calculate a neutral speed ratio of the transmission, and to compare the calculated neutral speed ratio to a calibrated ratio to determine whether the transmission is not in neutral.

9. The transmission assembly of claim 7, wherein the first calibrated timeout duration is about 150 ms to 250 ms.

10. The transmission assembly of claim 7, wherein the second calibrated timeout duration is about 800 ms to 900 ms.

11. The transmission assembly of claim 7, wherein the transmission is an automatic transmission.

12. The transmission assembly of claim 7, wherein the predetermined shift event is a downshift.

13. A method for use in a vehicle having a transmission with an input member, a transmission control module (TCM), an engine, and an engine control module (ECM), wherein the engine includes a crankshaft which rotates at an engine speed, the method comprising:
transmitting a positive engine speed request from the TCM to the ECM, wherein the engine speed request is a request for an increase in the engine speed in anticipation of a predetermined shift of the transmission;
determining whether the positive engine speed request is active for more than a first calibrated timeout duration;
automatically terminating the positive engine speed request when the positive engine speed request is active for more than a first calibrated timeout duration during which the transmission is not in neutral and both a shift of the transmission and an acceleration of the input member are not active, and after a second timeout duration that exceeds the first calibrated timeout duration regardless of whether the transmission is in neutral and the shift of the transmission and the acceleration of the input member are active.

14. The method of claim 13, further comprising determining whether the transmission is not in neutral by calculating a neutral speed ratio of the transmission, and comparing the calculated neutral speed ratio to a calibrated ratio.

15. The method of claim 13, wherein the first calibrated timeout duration is about 150 ms to 250 ms.

16. The method of claim 13, wherein the second calibrated timeout duration is about 800 ms to 900 ms.

* * * * *